July 12, 1966 — A. E. TOBEY — 3,259,959
AIR COOLED RASP
Filed Oct. 23, 1963 — 2 Sheets-Sheet 1

INVENTOR
ALTON E. TOBEY
BY
Gardner & Zimmerman
ATTORNEYS

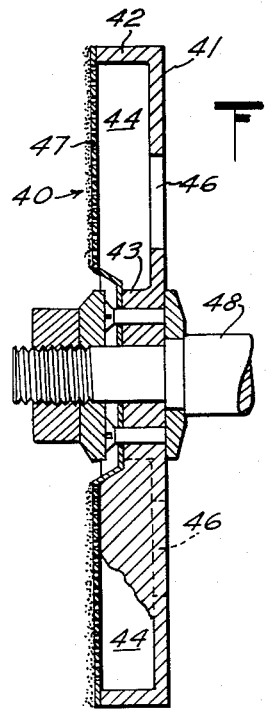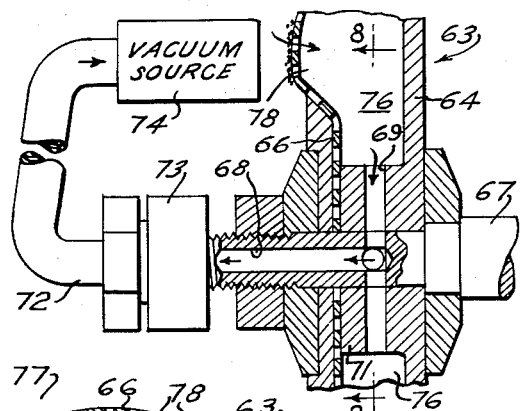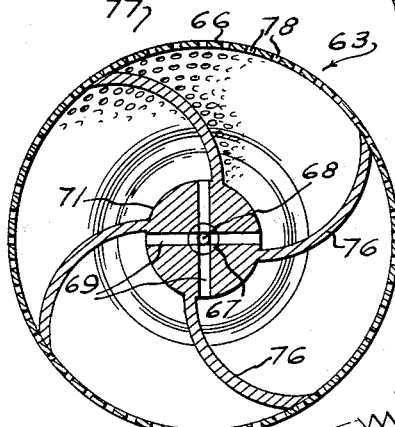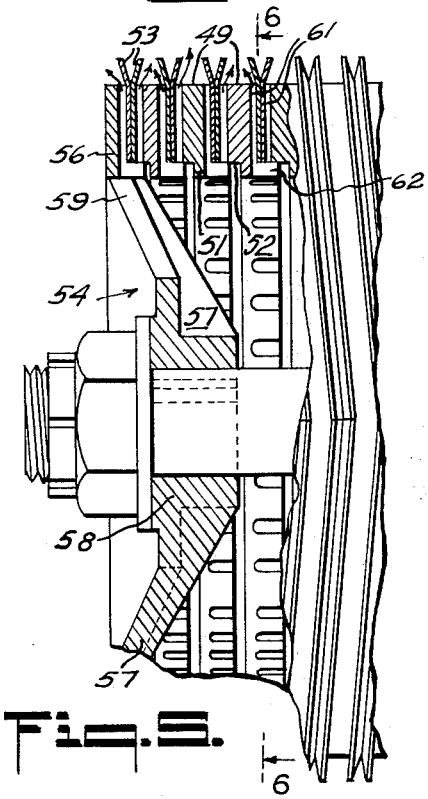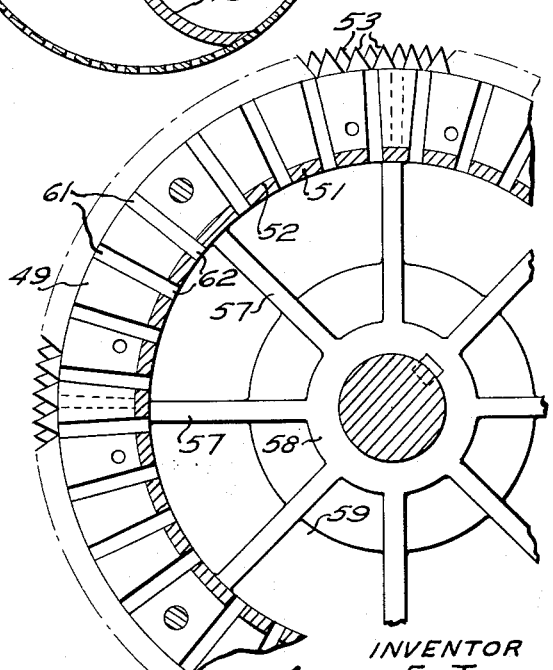
INVENTOR
ALTON E. TOBEY

United States Patent Office 3,259,959
Patented July 12, 1966

3,259,959
AIR COOLED RASP
Alton E. Tobey, 2203 Mission St., Santa Cruz, Calif.
Filed Oct. 23, 1963, Ser. No. 318,222
3 Claims. (Cl. 29—79)

This invention relates generally to rasps of the type employed in the buffing and abrading of rubber tire casings to prepare same for recapping, or the like. The invention is more particularly directed to an abrading rasp having provision for forced air cooling of its abrading surface as well as the surface of a tire or other work piece being abraded.

In the tire recapping industry, rasps are extensively employed to prepare the surface of a tire casing for the vulcanized bonding of new tread rubber thereto. Conventionally, tire buffing or abrading rasps include a hub which is provided with an abrading surface. The hub is adapted for driven rotation by a motor such that when a tire casing and the rotating abrasive surface of the hub are brought into contact, an abrading action occurs. By virtue of the friction involved, substantial heat is generated in the abrading process. Such heat tends to soften the rubber of the casing and detriments the abrading action. Of more importance, the heat materially reduces the life of the abrading surface of the rasp, irrespective of whether same employs bonded abrasive grit, tacks, blades, or the like. The foregoing considerations likewise apply to other types of abrading devices such as power sanders and the like.

It is, therefore, an object of the present invention to provide abrading devices which include self-contained means for cooling their abrading surfaces.

Another object of the invention is the provision of an abrading rasp which is arranged to establish a continuous flow of fluid coolant through flow passages provided in the abrading surface of the rasp.

Still another object of the invention is to provide an abrading rasp of the class described in the form of a hollow hub having vanes in the hub interior for forcing air through flow passages extending between the hub interior and exterior through peripheral abrading surfaces of the hub during hub rotation.

It is a further object of the present invention to provide fluid cooled abrading rasps which are extremely simple and economical in construction.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

FIGURE 4 is a sectional view taken at a diametric plane of a modified form of rasp.

FIGURE 5 is a sectional view taken at a diametric plane of still another modified form of rasp which includes rasp blades in the provision of an abrading surface.

FIGURE 6 is a sectional view taken at line 6—6 of FIGURE 5.

FIGURE 7 is a sectional view taken at a diametric plane through yet another modified form of rasp.

FIGURE 8 is a sectional view taken at line 8—8 of FIGURE 7.

Figure 1:
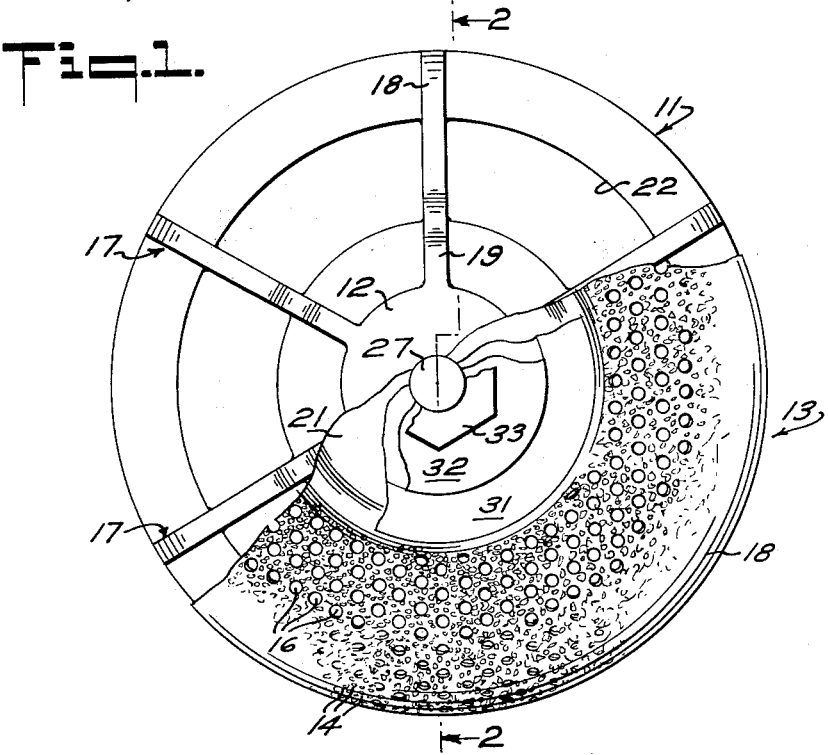
FIGURE 1 is an end view with portions broken away of a fluid cooled abrading rasp in accordance with the present invention.

Considering now the invention in some detail and referring to the illustrated forms thereof in the drawings, a fluid cooled abrading rasp or equivalent device is provided which will be seen to generally include a hollow hub adapted for driven rotation as by means of a motor. The hub includes an exterior abrading surface which would normally tend to become extremely hot by virtue of the friction involved in the conduct of an abrading operation. In accordance with the particularly salient aspects of the present invention the abrading surface is maintained relatively cool by fluid cooling means self-contained in the hub. To this end, means are provided, for admitting air, or other fluid, to or exhausting same from the hub interior, while flow passages extend through the hub periphery and open to the abrading surface. Vane means within the hub interior then direct the fluid outwardly or inwardly through the flow passages during hub rotation, to thereby effect cooling of the abrading surface.

Figures 2, 3:
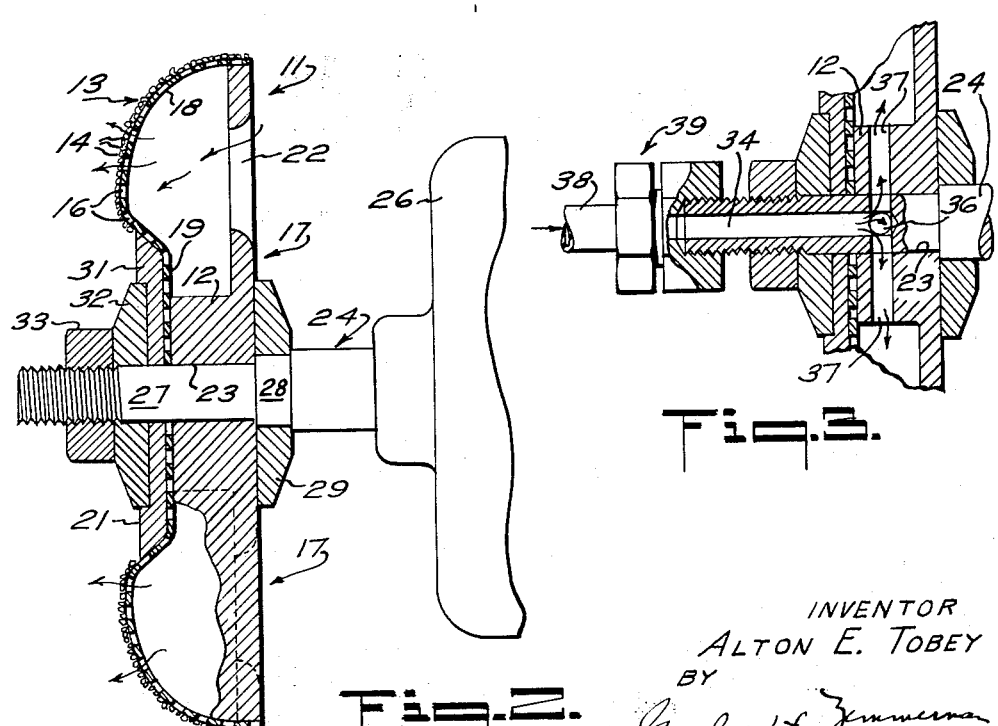
FIGURE 2 is a sectional view taken at line 2—2 of FIGURE 1.
FIGURE 3 is a fragmentary sectional view similar to FIGURE 2 but of a modified form of fluid feed thereof.

Referring now to FIGURES 1 and 2 in detail, one form of cooled abrading rasp of the type outlined hereinbefore is seen to include a circular head 11 having a central boss 12 on one face thereof. A perforate sheath 13 extends from the periphery of the head, longitudinally outwardly and radially inwardly to the face of the boss, in a manner subsequently described in detail, to define therewith a hollow hub. The peripheral surface of the sheath is provided with abrasive grit 14 bonded thereto, so as to thus define an abrading surface. Moreover, the sheath perforations 16 define flow passages between the abrading surface and hub interior. The vane means of previous mention are provided in the instant embodiment as a plurality of circumferentially spaced flat vanes 17 which extend radially outward from the boss 12 to the sheath 13. The vanes are preferably integral portions of the head, as shown. In the present case the vane periphery extends arcuately forward and radially inward from the rim of the head as indicated at 18 to terminate in a flat reentrant portion 19 which is coextensive with the face of the boss. The sheath 13 is contoured to the vane periphery and thus includes a central circular recessed region 21. The head is provided with arcuate openings 22 extending between the vanes which serve to admit air to the hub interior.

To facilitate driven rotation of the rasp, the head 11 is provided with an axial bore 23 for receiving the shaft 24 of a drive motor 26. In this regard a reduced end portion 27 of the shaft extends through the bore with the shoulder between the reduced portion and an enlarged portion 28 abutting the exterior face of the head. A holding plate 29 suitably secured to the enlarged shaft portion 28 may also be advantageously provided to abut the exterior face of the head. A backing plate 31 is preferably disposed on the reduced shaft portion 27 to engage the recessed region 21 of the sheath. A second holding plate 32 then abuts the backing plate and a nut 33 is threadably secured to the end of the reduced portion of the shaft to thereby secure the rasp assembly thereto.

Upon rotation of the rasp by motor 26, the rotating vanes 17 effect a suction of air into the hub interior through the openings 22. At the same time the vanes centrifugally pump the air from the hub interior outwardly through the sheath perforations 16. In other words the rotating vanes establish a forced air flow inwardly through the openings 22 and outwardly through the perforations 16. Such forced air flow is effective in cooling the abrading surface of the rasp.

Referring now to FIGURE 3, there will be seen to be provided a modified means for admitting air, or other fluid to the hub interior. In the instant embodiment the air inlet openings 22 are dispensed with and inlet flow of fluid proceeds through the shaft 24. More particularly, the reduced end portion 27 of the shaft is provided with an inwardly extending axial passage 34. This passage terminates in radially extending outlet openings 36 through the shaft which register with radial passages 37 extending through the boss 12 from the bore 23 to the hub interior. Pressurized air or other fluid is introduced to the passage 34 as by means of a hose 38 having a swivel coupling 39 secured to the reduced end portion 27 of the shaft. The coupling permits rotation of the rasp while at the same time establishing communication between the hose and passage 34. Pressurized fluid thus flows through the passage 34, openings 36, and passages 37 to the hub interior wherefrom the fluid is pumped by the vanes through the perforations 16 to cool the abrading surfaces.

The present invention applies to rasps having configurations other than that hereinbefore described in detail with respect to FIGURES 1–3. A rasp or equivalent device, such as a sander or the like, having an abrading end face as depicted in FIGURES 4 may be similarly arranged to facilitate cooling of the abrading surface. More particularly, as shown in FIGURE 4, an abrading device 40 is provided which includes a circular head 41 having an annular longitudinally projecting peripheral rim 42. The head also includes a central boss 43 which is concentrically inwardly spaced from the rim 42. Substantially rectangular vanes 44 provided integrally with the head extend radially between the boss and rim at circumferentially spaced positions thereof. Inlet openings 46 are provided in the end of the head extending arcuately between the vanes thereof. A perforate circular disc 47 is secured between the edge of the rim and the face of the boss to define a hollow hub with the head. Abrasive is carried on the exterior face of disc 47 to thereby define an abrading surface. With the head secured to a shaft 48 and rotated thereby, the vanes 44 suck air in through the openings 46 and pump the air out through the perforations of the disc 47 to thus cool the abrading surface. It will of course be appreciated that the abrading device 40 may be modified in the manner depicted in FIGURE 3 to facilitate admission of pressurized fluid to the hub interior through the rotary drive shaft.

Bladed abrading rasps may likewise be cooled in accordance with the present invention as indicated in FIGURES 5 and 6. As shown therein, a rasp is provided which includes a plurality of spacer rings 49 preferably including an exterior cylindrical male surface 51 adapted to engage a mating female interior surface 52 of an adjacent ring. Adjacent rings are intimately interengaged with serrated rasp blades 53 interposed between their end faces. Generally cylindrical heads 54 are provided at the opposite ends of the coaxially aligned array of interengaged rings and interposed blades. Such heads include annular rim portions 56 for engaging the outermost ones of the blades. In addition, means are provided to secure the heads and rings together in a rigid hub assembly. For further details of a rasp of the general type just described reference may be had to U.S. Patent No. 3,074,148, which issued January 22, 1963.

Considering now in detail the incorporation of means in the bladed rasp of FIGURES 5 and 6 for effecting cooling of the blades 53 thereof, at least one of the heads 54 is provided with a plurality of circumferentially spaced vanes 57 extending radially between the rim portion 56 and a central boss 58 thereof. Such vanes are preferably inclined in the radial inward direction. The head is further provided with inlet openings 59 extending arcuately between adjacent vanes to facilitate admission of air to the hub interior. Each of the spacer rings 49 is provided with circumferentially spaced channels 61 facing outwardly from the opposite end faces thereof. In addition, the male surfaces 51 of the respective rings includes openings 62 to provide communication between the channels and the hub interior. Thus with the blades interposed between adjacent rings, the channels define outlet flow passages therewith extending from the hub exterior. Upon rotation of the hub, the vanes 57 force air sucked in through the openings 59 outwardly through the openings 62 and channels 61 to thus cool the blades 53.

Although the invention has been described to this point primarily with reference to means for forcing air or other fluid outward through passages opening to the abrading surface, it should be noted that cooling of the abrading surface may be alternatively effected by an inward fluid flow. In this regard, the various fluid cooling abrading devices hereinbefore described may be provided with modified vane means which are arranged to centripetally induce fluid flow inwardly through the flow passages in the abrading surface to the hub interior. Such vane means may be advantageously employed in conjunction with means for applying suction to the hub interior to thereby exhaust the fluid, as well as other matter therefrom. With such an arrangement, simultaneously with cooling of the abrading surface material abraded from the workpiece is neatly sucked into the hub interior and deposited for example in a receptacle associated with the exhaust means. FIGURES 7 and 8 illustrate one embodiment of a device to the foregoing ends. An abrading device is provided which is similar to that of FIGURES 1 and 2 as modified in the manner depicted in FIGURE 3. More particularly the device comprises a hollow hub 63 defined by a head 64 and perforate sheath 66 having abrasive on its exterior surface. The head is secured to a rotary drive shaft 67 having a longitudinal passage 68 communicating with passages 69 extending through the head boss 71 to the hub interior. A hose 72 or the like is secured to shaft 67 and communicated with passage 68 as by means of swivel coupling 73. The hose 72 is in turn coupled to a vacuum source as indicated at 74. The head 64 is provided with arcuate vanes 76 which extend between the boss 71 and sheath 66. Thus, when the hub is rotated in the direction of arrow 77 (in the direction of vane curvature) the vanes effect a centripetal flow of air inwardly through the sheath perforations 78 towards the boss 71. With or without the assistance of the vacuum source, the air flow proceeds outwardly through the boss passages 69 and shaft passage 68. The action is of course enhanced by the employment of the vacuum source.

What is claimed is:

1. A rasp comprising a plurality of coaxially aligned spacer rings having rasp blades interposed therebetween, said rings having outwardly facing radially extending channels at their opposite end faces, a pair of heads coaxially aligned with said rings and engaged with the outermost ones thereof, at least one of said heads having a plurality of circumferentially spaced radially extending vanes projecting into the interior of said rings and having openings extending arcuately between the vanes, and means securing said heads, rings, and blades together, said vanes operative on rotation of the rasp to force fluid through said channels.

2. A rasp according to claim 1, further defined by said rings respectively having exterior cylindrical male surfaces in interfitting engagement with mating female interior surfaces of adjacent rings, said male surfaces having passages therethrough communicating with said channels.

3. A rotatable rasp comprising a plurality of coaxially aligned spacer rings defining an inner open portion, rasp blades removably interposed between peripheral end face portions of adjacent rings and extending radially outward therefrom, said rings having outwardly extending open-ended channels in peripheral face portions opposing faces of associated rasp blades, said channels communicating said inner open portion with the outer periphery of said rings adjacent said blades, a pair of heads coaxially aligned with said rings and engaged with the outermost ones thereof, one of said heads having opening therein, and one of said heads having vanes communicating with the inner open portions defined by said rings, said vanes being operative on rotation of the rasp to force fluid from said inner open portion into and outwardly through said channels, and means securing said heads, rings, and blades together.

References Cited by the Examiner

UNITED STATES PATENTS

| | | | |
|---|---|---|---|
| 1,054,656 | 2/1913 | McFeely | 29—78 X |
| 2,102,867 | 12/1937 | White. | |
| 2,594,647 | 4/1952 | Hendrickson | 51—266 X |
| 3,074,148 | 1/1963 | Hemmeter | 29—79 |
| 3,145,511 | 8/1964 | Bird et al. | 51—266 X |

ROBERT C. RIORDON, *Primary Examiner.*

LESTER M. SWINGLE, *Examiner.*

L. S. SELMAN, *Assistant Examiner.*